F. E. THOMAS.
LOCK SEAT FOR FISH LINE REELS.
APPLICATION FILED OCT. 23, 1912.
1,065,481.
Patented June 24, 1913.
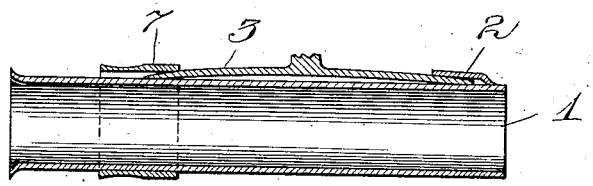
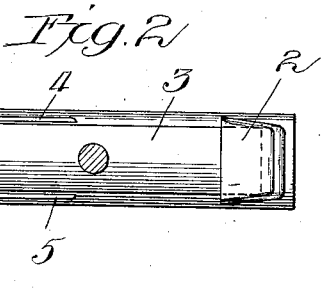
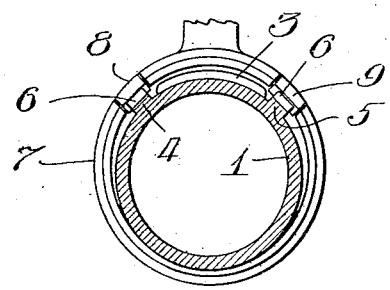
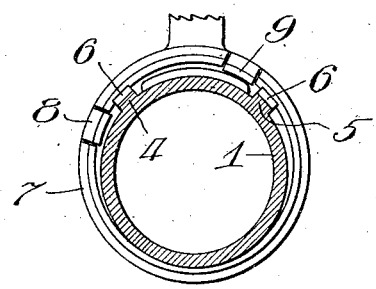
Witnesses:
Harry S. Gaither
Ruth E. Zetterwall
Inventor:
Fred E. Thomas
by Chamberlin Freudenreich
Attys

UNITED STATES PATENT OFFICE.

FRED E. THOMAS, OF BREWER, MAINE.

LOCK-SEAT FOR FISH-LINE REELS.

1,065,481. Specification of Letters Patent. Patented June 24, 1913.

Application filed October 23, 1912. Serial No. 727,306.

*To all whom it may concern:*

Be it known that I, FRED E. THOMAS, a citizen of the United States, residing at Brewer, county of Penobscot, State of Maine, have invented a certain new and useful Improvement in Lock-Seats for Fish-Line Reels, and declare the following to be a full, clear, and exact description of the same, such as will enable others skilled in the art to which it pertains to make and use the same, reference being had to the accompanying drawings, which form a part of this specification.

My invention has for its object to produce a simple, novel and reliable device for conveniently and securely locking a fish line reel upon a rod or a member mounted upon the rod and for permitting the reel to be detached readily at will.

The various features of novelty whereby my invention is characterized will hereinafter be pointed out with particularity in the claim; but, for a full understanding of my invention and of its object and advantages, reference may be had to the following detailed description taken in connection with the accompanying drawing, wherein:

Figure 1 is a longitudinal central section through a sleeve adapted to be mounted upon a fishing rod and containing my improvements, a reel base being shown locked in place on the sleeve; Fig. 2 is a plan view of the parts shown in Fig. 1; Fig. 3 is a section on an enlarged scale on line 3—3 of Fig. 2, looking in the direction of the arrows; and Fig. 4 is a view similar to Fig. 3, showing the locking band or ring in its unlocked position.

Referring to the drawing, 1 represents a cylindrical member which may be a part of a fishing rod or a device mounted on the rod, it being in the present instance illustrated as a sleeve adapted to be mounted upon a rod. Upon the member 1 is a socket, 2, of any usual construction into which one end of any usual reel base, 3, is adapted to be inserted. Behind the socket and running longitudinally of the member 1 are projecting ribs, 4 and 5, one being arranged at each side of the socket so as to leave room between the ribs for the reel base. The ribs are provided with ratchet teeth, 6, the vertical faces of the ratchet teeth facing toward the mouth of the socket. These teeth may extend for any desired distance along the ribs. Surrounding the member 1 and the ribs thereon, is a loose band or ring, 7, which is adapted to be slipped over the rear end of the reel base so as to clamp the latter in place. Two tongues, 8 and 9, are formed in the ring or band by partially severing narrow strips along lines extending inwardly from the rear edge of the ring or band thus, the ring or band being made of resilient metal, providing two spring pawls spaced apart an angular distance equal to the angular distance between the two ribs. The pawls are bent inwardly slightly at their free ends so as to make them project inwardly beyond the inner surface of the band or ring, thus permitting them to ride upon the toothed ribs.

When a reel is to be fastened to the rod, the locking band or ring is moved back far enough to permit the reel base to be set upon the cylindrical member with its front end engaged in the socket 2; the locking ring or band is then turned so as to bring the tongues or pawls over the ribs; and, upon pushing the locking band or ring forward, the tongues or pawls ride over the ratchet teeth until the ring or band becomes firmly seated and clamps the rear end of the reel base to the cylindrical member. The band or ring is held against backward movement by means of the ratchet teeth and the pawls. To release the reel base, it is only necessary to turn the locking band or ring slightly so as to bring the tongues or pawls to one side of the ribs and out of engagement with the ratchet teeth, whereupon the band or ring may be slipped back off the rear end of the reel base. It will thus be seen that the ribs serve accurately to position the reel base and prevent its displacement in a lateral direction. It will furthermore be seen that by providing two sets of ratchet teeth and pawls, a very secure lock is obtained. It will also be seen that by placing the ratchet teeth in the raised ribs, there is no tendency to twist the tongues or pawls when the band or ring is turned to disengage the tongues or pawls from the teeth; consequently the locking band or ring may be turned from one position to another without producing any strain upon the tongues or pawls. As a result of these advantages I obtain a locking seat which permits quick accurate adjustment, holds the reel securely in place, and permits ready removal of the reel when desired.

While I have illustrated and described with particularity only a single preferred form of my invention, I do not desire to be limited to the exact structural details thus illustrated and described; but intend to cover all forms and arrangements which fall within the terms of the definitions of my invention constituting the appended claim.

I claim:

In a device of the character described, a cylinder having thereon a socket adapted to receive one end of a reel base, longitudinal ribs on said cylinder behind and at opposite sides of said socket, ratchet teeth arranged along the top of said ribs with their vertical faces directed toward said socket, and a locking band slidably and revolubly surrounding said cylinder and said ribs, said sleeve having portions partially severed therefrom in the end farthest from said socket to form spring pawls adapted to engage with said ratchet teeth.

In testimony whereof, I sign this specification in the presence of two witnesses.

FRED E. THOMAS.

Witnesses:
WILLIAM F. BLANDING,
WILLIAM W. DOANE.

Copies of this patent may be obtained for five cents each, by addressing the "Commissioner of Patents, Washington, D. C."